A. DICKERSON.
WATER GOVERNOR.
APPLICATION FILED APR. 2, 1910.
983,216.
Patented Jan. 31, 1911.
2 SHEETS—SHEET 2.
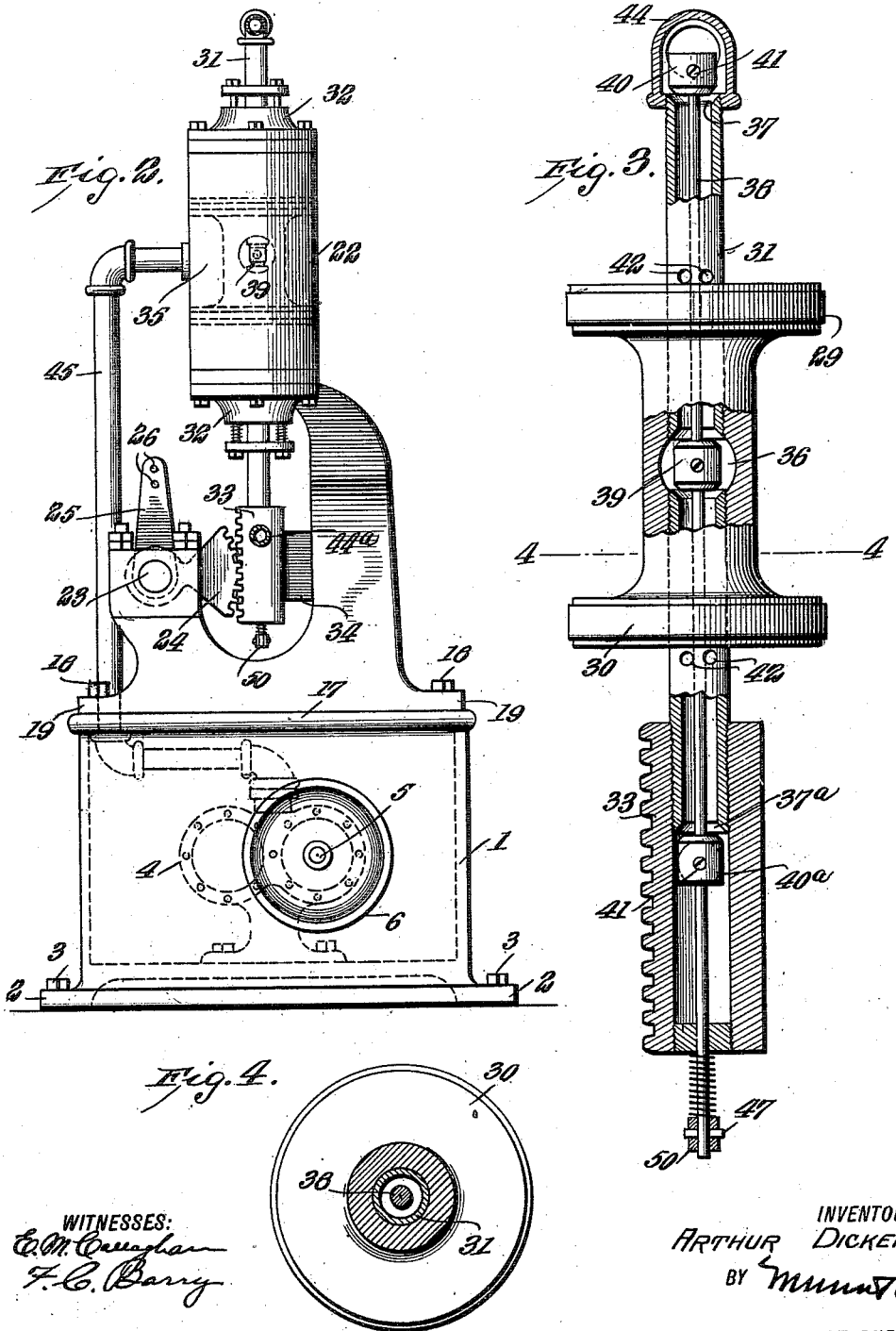
WITNESSES:
INVENTOR
ARTHUR DICKERSON
BY
ATTORNEYS

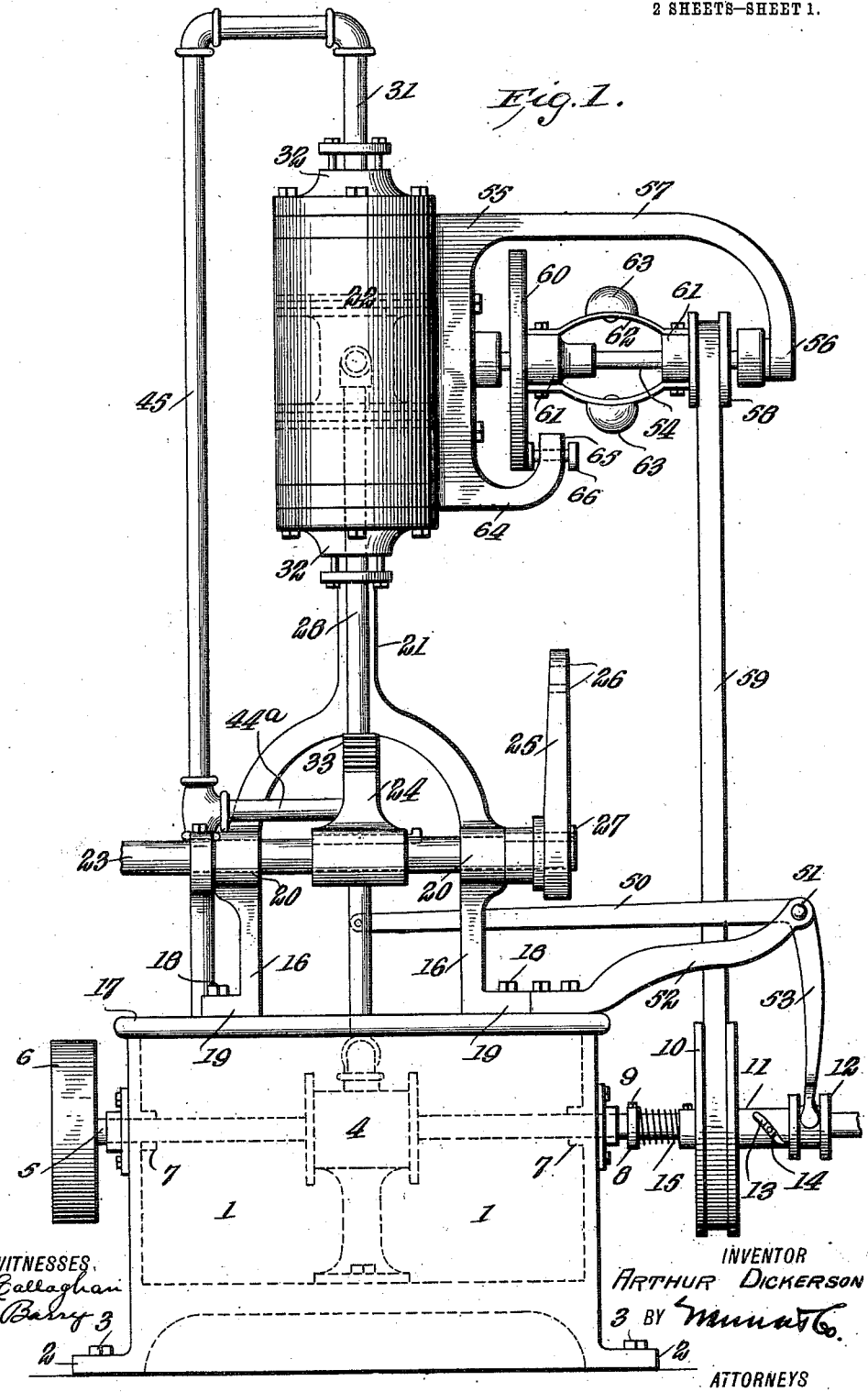

UNITED STATES PATENT OFFICE.

ARTHUR DICKERSON, OF AMERICAN FORK, UTAH, ASSIGNOR TO DICKERSON AUTOMATIC GOVERNOR COMPANY, A CORPORATION OF UTAH.

WATER-GOVERNOR.

983,216. Specification of Letters Patent. Patented Jan. 31, 1911.

Application filed April 2, 1910. Serial No. 553,085.

*To all whom it may concern:*

Be it known that I, ARTHUR DICKERSON, a citizen of the United States, and a resident of American Fork, in the county of Utah and State of Utah, have invented certain new and useful Improvements in Water-Governors, of which the following is a specification.

My invention is an improvement in water governors, and consists in certain novel constructions and combinations of parts hereinafter described and claimed.

The object of the invention is to provide a fluid operated or hydraulic governor for prime movers.

Referring to the drawings forming a part hereof:—Figure 1 is an elevation of the apparatus. Fig. 2 is a sectional side view thereof. Fig. 3 is a detail enlarged view, partly in section, illustrating the valve mechanism, and Fig. 4 is a cross section on about line 4—4 of Fig. 3.

In the embodiment of the invention shown in the drawings, a tank 1 is provided, having a base flange 2, whereby it may be secured to a support by bolts 3, and a rotary pump 4, of any preferred construction, is mounted in the tank. The shaft 5 of the pump extends through the tank at both ends, and one end is provided with a driving pulley 6 which is connected in any suitable manner with the prime mover. A bearing 7 is provided for the shaft in each end of the tank, and at the opposite end from the pulley 6, a collar 8 is adjustably secured to the shaft by a set screw 9. A grooved pulley 10 is journaled on the shaft beyond the collar, and the hub 11 of the pulley is provided with a grooved disk 12, and with a spiral slot 13, between the pulley and the collar 8, through which extends a pin 14 on the shaft. A coil spring 15 encircles the shaft between the collar and the inner end of the hub of the pulley.

A connecting frame 16 is secured to the cover 17 of the tank by bolts 18 passing through the cover and a base flange 19 on the frame, and the said frame is provided at one side with spaced bearings 20, and at the other side and between the bearings with a flange 21. A cylinder 22, to be presently described in detail, is supported in a vertical position by the flange, and a shaft 23 is journaled in the bearings. Between the bearings 20, the shaft is provided with a laterally extending toothed sector 24, and outside of the bearings with an arm 25 provided with a longitudinal series of spaced openings 26, and secured to the shaft by a key 27, and the arm is connected to the controlling device of the prime mover.

The cylinder 22, before mentioned, is connected with the pump by a pipe 28, the said pipe leading from the pump and opening at the vertical center of the cylinder. A plunger consisting of a pair of spaced pistons or heads 29 and 30 is slidable in the cylinder, and the pistons are connected and retained in spaced relation by a hollow piston rod 31 attached to each end of the plunger, the said rods extending through packing nuts 32 at each end of the cylinder. At its lower end, the hollow piston rod is provided with a rack bar 33, the teeth thereof meshing with the teeth of the sector, and a guide shoe 34 extends forwardly from the main frame 16, the rack being slidable on the shoe. The pipe leading from the pump to the cylinder opens, as before stated, at the center of the cylinder, and into the space 35 between the pistons. The plunger rod is provided at its center with an opening 36 forming two valve seats, and at each end with a similar opening 37 and $37^a$. A stem 38 is arranged within the hollow rod, and one double valve 39 and two single valves 40 and $40^a$ are connected with the stem, and coöperate with the four seats 36, 37 and $37^a$, respectively. The central valve 39 is adapted to close either end of the hollow rod, in accordance with the direction in which it is moved, and all of the valves are in the form of blocks, as shown, and are secured to the stem by screws 41. At each end of the plunger, and close to the outer face of the adjacent piston, the hollow piston rod is also provided with a plurality of openings 42 forming intake and exhaust ports.

The rack bar 33, before mentioned, has a longitudinal opening into which the hollow piston rod is screwed, and each end of the said piston rod is connected by a branch pipe 44 and $44^a$, with a pipe 45 which delivers the exhaust at its lower end to the tank, passing through the cover thereof.

The lower end of the stem 38 is provided with a transverse pin 47, and the ends of the pin are received in slots 48, in the arms of a fork 44 on one arm 50 of an elbow lever, pivoted, as at 51, to an arm 52 extending laterally from the cover 17, and the opposite arm 53 of the lever is provided with a fork engaging the groove of the disk 12.

A shaft 54 is journaled in bearings 55 and 56 in the flange 21 and in a bearing arm 57 extending laterally from the cylinder 22, and a pulley 58 is secured to the shaft, and is connected by a belt 59 with the pulley 10 on the pump shaft. A disk 60 is also arranged on the shaft 54 and is movable longitudinally thereof while constrained to rotate with the shaft. Both the disk 60 and the pulley 58 are provided with hubs 61, which are connected by plate springs 62, each of which has a weight 63 secured thereto, the whole forming a centrifugal governor. When the shaft 54 exceeds a predetermined speed, the weights pull the springs radially outward, thus moving the disk toward the pulley. An arm 64 extends laterally from the cylinder support, and is provided with an angular portion 65, through which passes a screw 66, containing a buffer engaging the adjacent face of the disk 60.

It will be understood that the cylinder is practically divided into three chambers, a central chamber between the pistons, and a chamber at each end of the plunger; and that the circulation of the fluid is from the pump to the central chamber, and normally from thence through both ends of the hollow piston rod and the exhaust pipe to the tank. The valve 39 controls the communication between the central chamber and the respective ends of the piston rod. When the valve is moved upward, the communication between the central chamber and the upper end of the piston rod is closed, and when moved downward, the communication between the said chamber and the lower end of the piston rod is closed. The arrangement of the valves on the stem is such that when the intake of the upper chamber is closed, the outlet of lower chamber is simultaneously closed, thereby cutting off pathway of live fluid to tank, consequently increasing pressure of same in lower chamber, at the same time reducing pressure in upper chamber through exhaust valve 40 being open to branch pipe 44, thence to the tank. It will be plain that when the flowing fluid is cut off from upper chamber through the closing of valve 39, the forced fluid will by reason of confinement in lower chamber cause pressure to raise to such a degree that the piston will be moved upward, driving out the neutral fluid through plural valve openings 42 and exhaust valve 40. To obtain a reverse action, valve 39, will be moved downward, thereby cutting off flow of fluid to lower chamber simultaneously closing exhaust valve 40, thereby cutting off discharge fluid from upper chamber. The pressure will now raise in upper chamber, while lower chamber will be exhausted through plural openings 42$^a$ and exhaust valve 40$^a$ and through branch pipe 44$^a$ and then return to tank. Normally the valves stand in the position shown in Fig. 3, that is with all of the valves partly open, so that the fluid may circulate from the pump to the central chamber and through both branch pipes 44 and 44$^a$ to the tank. When, however, the prime mover exceeds a predetermined speed, the pump shaft is also driven at a faster rate of speed, and the weights of the governor are thrown outward. The governor exerts a certain amount of drag on the pulley 10 at all times, and the faster the pulley turns, the greater the amount of drag. The drag tends to slow the pulley with respect to the shaft, and through the pin and spiral slot connection, the pulley is moved outward longitudinally of the shaft. The outward movement of the pulley rocks the elbow lever 50—53 and the stem 38 is moved downward. The fluid from the pump may now pass from the central chamber through the plural openings 42, into the upper chamber, and may pass from the lower chamber through the plural openings 42 to the tank. It will be evident that with the valves so arranged, the pressure in the lower chamber will decrease, while that in the upper chamber will be increased, and the plunger will be moved downward. When the plunger is so shifted, the shaft 23 will be oscillated, and the arm 25, through its connection with the controlling mechanism of the prime mover, will slow the same. The spring 15 normally tends to move the pulley 10 inward, and when the prime mover falls below the predetermined speed, the spring comes into action, and reverses the process above described. The natural tendency of the pulley 10 is to incline forward, while that of the centrifugal is to oppose it and the plunger through the elbow lever will maintain corresponding positions. The ends of the hollow piston rod are slidably connected with the branch pipes 44 and 44$^a$, the lower end through the medium of the rack bar.

As shown in Fig. 3, the rack bar is provided with a longitudinal hole in bottom end, and the valve rod is slidable in the hole and suitably packed. At its upper end, the rod is similarly mounted in a sleeve 66.

The shaft 23 is provided at the opposite end from the arm, with a collar 67, secured in place by a set screw 68 to prevent longitudinal movement of the shaft.

It will be evident that the screw 66 with buffer will act as a brake when the disk is drawn outward, and the speed may be regulated by moving the said screw toward or away from the face of the disk.

I claim:—

1. A hydraulic governor, comprising a tank, a pump therein, the shaft of the pump extending through the ends of the tank, means for connecting one of the ends with the prime mover, a longitudinally movable pulley on the other end, said pulley having a hub provided with a spiral slot, a pin on the shaft extending into the slot, a peripherally grooved disk rigid with the hub, a governor, a driving connection between the pulley and the governor for operating the same, a cylinder above the pump, a communication between the pump and the center of the cylinder, a plunger comprising a pair of spaced pistons in the cylinder, a hollow piston rod attached to each end of the plunger and extending through the ends of the cylinder, a pipe leading to the tank and having a branch at each end of the cylinder, a sliding connection between each branch and the adjacent end of the piston rod, said rod having an inlet opening in the space between the pistons and a plurality of exhaust openings at each end of the plunger, a valve stem in the piston rod, a valve on each end of the stem, a double valve at the center of the stem, said valves being so spaced on the stem that when in normal position, the valves will be unseated, an elbow lever having one arm connected with the lower end of the valve stem and the other arm engaging the groove of the disk, a shaft provided near one end with an arm for connecting with the controlling mechanism of the prime mover, and having intermediate its ends a gear sector, and a rack bar on the piston rod meshing with the sector.

2. A hydraulic governor, comprising a tank for the liquid, a pump in the tank, a shaft for operating the pump extending outside of the tank at each end, means for connecting one end of the shaft to the prime mover, a longitudinally movable pulley on the other end, said pulley having a hub provided with a spiral slot, and the shaft having a pin engaging the slot, a governor driven by the pulley, a cylinder, a plunger therein comprising a pair of spaced pistons, a hollow piston rod attached to each end of the plunger and extending through the ends of the cylinder, a connection between the pump and the cylinder at the space between the pistons, a pipe opening into the tank and having a branch slidably connected with each end of the piston rod, a rack bar on the lower end of the piston rod, a shaft having at one end an arm adapted to be connected with the controlling mechanism of the prime mover, a gear sector on the shaft meshing with the rack bar, a valve stem in the piston rod and extending through the lower end thereof, an elbow lever having one end connected with the stem and the other with the hub of the pulley, said piston rod having at each end a valve seat, and having an opening into the space between the pistons and openings at each end of the plunger, a valve on the stem for each valve seat, and a double valve for the central opening and adapted to close the communication between the said space and either end of the piston rod.

3. A hydraulic governor, comprising a tank, a pump in the tank, the shaft of the pump extending through the ends of the tank, means for connecting one end of the shaft of the pump with a prime mover, a longitudinally movable pulley on the other end of the shaft, said pulley having a hub provided with a spiral slot, a pin on the shaft extending into the slot, a governor, a connection between the pulley on the governor for operating the same, a cylinder above the pump, a communication leading from the pump to the cylinder intermediate its ends, a plunger comprising spaced pistons in the cylinder, a hollow piston rod attached to each end of the plunger and extending through the ends of the cylinder, a pipe leading to the tank and having a branch at each end of the piston rods, a sliding connection between each branch and the adjacent end of the piston rod, said rod having an inlet opening in the space between the pistons and the plural openings at each end of the plunger, a valve stem in the piston rod, a valve on each end of the stem, a double valve intermediate the ends of the stem, said valves being so spaced on the stem that when in normal position they will be unseated, and a connection between the lower end of the valve rod and the pulley, for moving said pulley longitudinally of the shaft for the purpose specified.

4. In a device of the character specified, the combination with a pump, a governor operated thereby, and means for connecting the pump with the prime mover, of a cylinder, a plunger comprising spaced rigidly connected piston heads movable in the cylinder, the pump delivering to the cylinder between the heads of the plunger, said plunger having passages leading from the space between the heads to discharge pipes at each end of the piston rod, each of said passages having ports intermediate the plunger and the discharge pipe, said ports delivering to the adjacent end of the cylinder, rigidly connected valves for controlling said passages and ports, a connection between the governor and the valves for operating the same to simultaneously close the intake and open the exhaust to one end of the cylinder and to open the intake and close the exhaust to the other end of the cylinder, whereby to cause the fluid entering the cylinder to shift the plunger, a controlling mechanism for the prime mover, and a connection between the plunger and the controlling mechanism for operating the same.

5. In a device of the character specified, the combination with a pump and a governor operated thereby, of means for controlling the speed of the prime mover, comprising a cylinder, a plunger comprising spaced rigidly connected piston heads movable in the cylinder, the pump delivering to the cylinder between the heads of the plunger, said plunger having passages leading from the space between the heads to discharge pipes at each end of the piston rods, each of said passages having ports intermediate the plunger and the discharge pipe, said ports delivering to the adjacent end of the cylinder, rigidly connected valves for controlling said passages and ports, a connection between the governor and the valves for operating the same to simultaneously close the intake and open the exhaust to one end of the cylinder and to open the intake and close the exhaust to the other end of the cylinder, whereby to cause the fluid entering the cylinder to shift the plunger, and a connection between the plunger and the controlling mechanism for the prime mover for operating the same when the valve is shifted.

6. In a device of the character specified, the combination with a pump and a governor for the operating mechanism of the pump, operated by the prime mover, of a cylinder, a plunger comprising spaced rigidly connected piston heads movable in the cylinder, the pump delivering to the cylinder between the heads of the plunger, said plunger having passages leading from the space between the heads to discharge pipes at each end of the piston rod, each of said passages having ports intermediate the plunger and the discharge pipe, said ports delivering to the adjacent end of the cylinder, rigidly connected valves for controlling said passages and ports, a connection between the governor and the valves for operating the same to simultaneously close the intake and open the exhaust to one end of the cylinder and to open the intake and close the exhaust to the other end of the cylinder whereby to cause the fluid entering the cylinder to shift the plunger, and a connection between the plunger and the operating mechanism of the prime mover for controlling the same.

ARTHUR DICKERSON.

Witnesses:
  Wm. Chipman,
  W. S. Chipman.